US010103932B2

(12) United States Patent
Baranski et al.

(10) Patent No.: US 10,103,932 B2
(45) Date of Patent: Oct. 16, 2018

(54) TECHNIQUE FOR ASSISTING REMOTE DIAGNOSIS OF AN ACCESS GATEWAY

(71) Applicant: Orange, Paris (FR)

(72) Inventors: Fabrice Baranski, Chantepie (FR); Fabrice Fontaine, Geveze (FR); Simon Gloanec, Rennes (FR)

(73) Assignee: ORANGE, Paris (FR)

( * ) Notice: Subject to any disclaimer, the term of this patent is extended or adjusted under 35 U.S.C. 154(b) by 239 days.

(21) Appl. No.: 15/119,012

(22) PCT Filed: Feb. 3, 2015

(86) PCT No.: PCT/FR2015/050249
§ 371 (c)(1),
(2) Date: Aug. 15, 2016

(87) PCT Pub. No.: WO2015/121563
PCT Pub. Date: Aug. 20, 2015

(65) Prior Publication Data
US 2017/0054589 A1 Feb. 23, 2017

(30) Foreign Application Priority Data

Feb. 14, 2014 (FR) ...................................... 14 51191

(51) Int. Cl.
*H04L 12/24* (2006.01)
*H04L 12/66* (2006.01)
(Continued)

(52) U.S. Cl.
CPC .............. *H04L 41/06* (2013.01); *H04L 12/66* (2013.01); *H04L 41/044* (2013.01);
(Continued)

(58) Field of Classification Search
CPC ..... H04W 4/06; H04W 76/02; H04W 76/023; H04W 76/14; H04L 12/24; H04L 12/66;
(Continued)

(56) References Cited

U.S. PATENT DOCUMENTS 8,125,894 B2 * 2/2012 Van Den Bosch .......................... H04L 12/2803
370/219
8,995,284 B2 * 3/2015 Van Greunen ...... H04L 41/0659
370/242
(Continued)

FOREIGN PATENT DOCUMENTS

WO 2010064964 A1 6/2010

OTHER PUBLICATIONS

Broadband Forum, TR-069 "CPE WAN Management Protocol", Issue 1, Amendment 5, Issue date Nov. 2013.
(Continued)

*Primary Examiner* — Tri H Phan
(74) *Attorney, Agent, or Firm* — David D. Brush; Westman, Champlin & Koehler, P.A.

(57) ABSTRACT

A technique for assisting remote diagnosis of an access gateway by an administration apparatus. The gateway enables access to a wide area communication network via an access network. A failure affecting access to the wide area communications network gateway via the access network is detected. A device obtains an identifier of the access gateway and a datum assisting diagnosis of the failure by using a radio communication channel and sends the identifier and the datum obtained to the administration apparatus via an access means in an operational state.

8 Claims, 3 Drawing Sheets

(51) Int. Cl.
*H04L 29/08* (2006.01)
*H04W 4/06* (2009.01)
*H04W 76/14* (2018.01)
*H04W 76/02* (2009.01)

(52) U.S. Cl.
CPC .......... *H04L 67/2861* (2013.01); *H04W 4/06* (2013.01); *H04W 76/023* (2013.01); *H04W 76/14* (2018.02)

(58) Field of Classification Search
CPC ......... H04L 29/06; H04L 29/08; H04L 41/06; H04L 41/044; H04L 67/2861
See application file for complete search history.

(56) References Cited

U.S. PATENT DOCUMENTS

| | | | | |
|---|---|---|---|---|
| 2001/0007138 A1* | 7/2001 | Iida | ............. | G06F 11/0709 714/25 |
| 2004/0078683 A1* | 4/2004 | Buia | ............. | H04L 12/66 714/37 |
| 2004/0221035 A1* | 11/2004 | Morikawa | ............. | H04L 41/06 709/224 |
| 2007/0201508 A1 | 8/2007 | Blackford et al. | | |
| 2009/0034424 A1* | 2/2009 | Chen | ............. | H04L 41/06 370/245 |
| 2014/0129613 A1* | 5/2014 | Van Depoel | ............. | H04L 67/125 709/202 |
| 2016/0323163 A1* | 11/2016 | Abdulnour | ............. | H04L 41/16 |

OTHER PUBLICATIONS

International Search Report dated Mar. 13, 2015 for corresponding International Application No. PCT/FR2015/050249, filed Feb. 3, 2015.

Written Opinion of the International Searching Authority dated Mar. 13, 2015 for corresponding International Application No. PCT/FR2015/050249, filed Feb. 3, 2015.

English translation of the Written Opinion of the International Searching Authority dated Mar. 13, 2015 for corresponding International Application No. PCT/FR2015/050249, filed Feb. 3, 2015.

* cited by examiner

TECHNIQUE FOR ASSISTING REMOTE DIAGNOSIS OF AN ACCESS GATEWAY

CROSS-REFERENCE TO RELATED APPLICATIONS

This Application is a Section 371 National Stage Application of International Application No. PCT/FR2015/050249, filed Feb. 3, 2015, the content of which is incorporated herein by reference in its entirety, and published as WO 2015/121563 on Aug. 20, 2015, not in English.

FIELD OF THE DISCLOSURE

The invention relates to the general field of telecommunications.

The invention more particularly concerns assistance in remote diagnosis of a fault affecting an access gateway from a piece of administrative equipment.

BACKGROUND OF THE DISCLOSURE

The access gateway allows particularly equipment or devices located on a customer site to access a wide area communication network WAN (for "wide area network"), such as the Internet network. These devices are also called CPEs, for "customer premises equipment". For a local area network, they are particularly the access gateway, a TV decoder "set-top box" and a mobile terminal. Within the context of a home automation network, they are also household appliances, alarm systems and sensors.

In order to guarantee quality services, it is preferable for an operator of the wide area communication network to be able to manage such devices remotely.

Remote management of the devices particularly requires:
  detection and knowledge of the devices that are present in the local area network, for example their serial numbers, their hardware and software versions;
  supervision of these devices, for example by obtaining supervision information and performance indicators.

Remote management of the devices of a local area network is reliant on a technical report drafted by the Broadband Forum, TR-069 "CPE WAN Management Protocol". This technical report defines a CWMP protocol, allowing communication between a piece of administrative equipment, called remote auto-configuration equipment ACS (for "auto-configuration server"), and a device of the local area network. The CWMP protocol defines a mechanism that allows, in particular, secure auto-configuration of the equipment of the local area network and other functions for managing these devices.

It is particularly possible for the operator of the network to make remote interventions, such as:
  updating the software or the firmware of a device when the software version or the firmware needs to move on;
  making a diagnosis when a device has a malfunction;
  dynamically installing and configuring new services;
  monitoring the state and the performance of a device.

The CWMP protocol is reliant on the Internet protocol, more precisely on TCP/IP (for "transmission control protocol"). The data allowing remote management of the devices of the network, for example data for assisting in diagnosis, are transmitted by each device to the administrative equipment by means of the CWMP protocol. When access to the wide area communication network WAN is no longer possible via the access gateway, it is then impossible to make contact with the administrative equipment in order to transmit data for assisting in diagnosis to it.

Consequently, it is impossible for a customer support advisor of the operator to automatically retrieve the data for assisting in diagnosis when the access gateway no longer allows access to the wide area communication network. The advisor therefore has to question the customer orally in order to be able to establish a technical diagnosis, making this work difficult and not very reliable.

SUMMARY

According to a first aspect, the subject of the invention is a method for assisting in remote diagnosis, by a piece of administrative equipment, of an access gateway, said gateway allowing access to a wide area communication network via an access network. The method comprises the steps of:
  detection of a fault affecting access by the gateway to the wide area communication network via said access network;
  obtainment, by a device, of an identifier for the access gateway and of a datum for assisting in a diagnosis of the fault by means of a radio communication channel;
  sending, by said device, of said identifier and of said datum, which have been obtained via an access means in working order, to the administrative equipment.

A fault affecting access by the gateway to the wide area communication network is subsequently understood to mean both a fault in a hardware element of the gateway contributing to this access and a fault associated with the connection of the gateway to the access network. The fault may thus be situated in the access network itself and affect a plurality of access gateways. The access gateway is not designed to determine where the fault is situated, but is able to indicate, by means of a specific fault code, the effect of this fault on its access to the wide area communication network.

Thus, by virtue of the radio communication channel, the access gateway transfers its identifier and a datum for assisting in diagnosis to a device playing a proxy role for a service for assisting in diagnosis, so that this device is able to transmit the information to the administrative equipment instead of the gateway affected by the fault. This allows the administrative equipment to become clear about the type of fault affecting access by the gateway and to trigger corrective actions as though it had received the information directly from the gateway affected by the fault. At present, a user of the local area network has to contact an operator from the after-sales service in order to indicate the fault to him. The user is not generally capable of providing detailed information about the type of fault. As a result of implementation of the method for assisting in diagnosis, it is possible for a certain number of faults to be resolved directly from the administrative equipment without intervention by the user. The datum for assisting in diagnosis also allows the administrative equipment to trigger corrective actions suited to the current fault, requiring no actions on the part of the user. The user route is simplified and the duration of the fault can be reduced in a majority of fault cases. This also allows the administrative equipment to detect a fault in the access network affecting a plurality of access gateways.

The device playing the proxy role may be a device of the local area network or else a device outside the local area network. It may be either a mobile terminal having radio access to the wide area communication network or another access gateway having access in working order. It is emphasized here that implementation of the method does not require the addition of equipment to the local area network but rather is reliant on an environment of the local area network. The proposed solution is thus very simple to set up.

The various embodiments or embodiment features mentioned below can be added independently or in combination with one another to the steps of the method for assisting in diagnosis as defined above.

In one particular embodiment, the method for assisting in diagnosis moreover comprises a pairing of said device with the access gateway in order to obtain said identifier and said datum.

Sending of the identifier of the gateway and the datum for assisting in diagnosis is thus triggered after pairing between the access gateway and the device playing the proxy role.

In one particular embodiment, the method for assisting in diagnosis moreover comprises a detection of said device by the access gateway.

In this embodiment, the access gateway affected by the fault looks for a device to which it can set up a radio communication channel so that this device plays the proxy role for the service for assisting in diagnosis. This is transparent for the user, who has no action to take.

According to one particular feature, the method for assisting in diagnosis moreover comprises a broadcast, by the device, of a datum indicating that a proxy service for assisting in diagnosis is available.

The access gateway can thus directly select a device providing this service for assisting in diagnosis. This makes it possible to avoid contacting devices that do not provide this service. The communication of the identifier and of the datum for assisting in diagnosis is thus faster.

According to a second aspect, the invention also concerns an access gateway designed to allow access to a wide area communication network via an access network. The gateway comprises:
  an administrative module, designed to send and receive remote administration data from a piece of administrative equipment;
  a module for detecting a fault affecting access by the gateway to the wide area communication network via said access network;
  a module for sending to a device an identifier for the access gateway and a datum for assisting in a diagnosis of the fault by means of a radio communication channel, said identifier and said datum being intended to be sent by said device to said administrative equipment via an access means in working order.

The advantages set out for the administrative method according to the first aspect are directly transferrable to the access gateway.

According to a third aspect, the invention also concerns a device for assisting in diagnosis of a fault affecting access by an access gateway to a wide area communication network via an access network, said device comprising:
  a module for obtaining an identifier for the access gateway and a datum for assisting in a diagnosis of the fault by means of a radio communication channel and for sending to a piece of administrative equipment said identifier and said datum, which have been obtained via an access means in working order, said administrative equipment being provided for remote administration of the access gateway.

The advantages set out for the method for assisting in diagnosis according to the first aspect are directly transferrable to the device.

According to a fourth aspect, the invention also concerns a system comprising an access gateway according to the second aspect and at least one device according to the third aspect.

The advantages set out for the method for assisting in diagnosis according to the first aspect are directly transferrable to the system.

According to a fifth aspect, the invention concerns a program for an access gateway, comprising program code instructions intended to control the execution of those of the steps of the method for assisting in diagnosis described above that are implemented by the access gateway when this program is executed by this gateway and a recording medium that is readable by an access gateway and on which a program for a gateway is recorded.

The advantages set out for the method for assisting in diagnosis according to the first aspect are directly transferrable to the program for an access gateway and to the recording medium.

According to a sixth aspect, the invention concerns a program for a device, comprising program code instructions intended to control the execution of those of the steps of the method for assisting in diagnosis described above that are implemented by the device when this program is executed by this device and a recording medium that is readable by a device and on which a program for a device is recorded.

The advantages set out for the method for assisting in diagnosis according to the first aspect are directly transferrable to the program for a device and to the recording medium.

BRIEF DESCRIPTION OF THE DRAWINGS

The invention will be better understood with the aid of the description that follows for particular embodiments of the technique for assisting in remote diagnosis of a device, with reference to the appended drawings, in which.

DETAILED DESCRIPTION OF ILLUSTRATIVE EMBODIMENTS

Figure 1A:
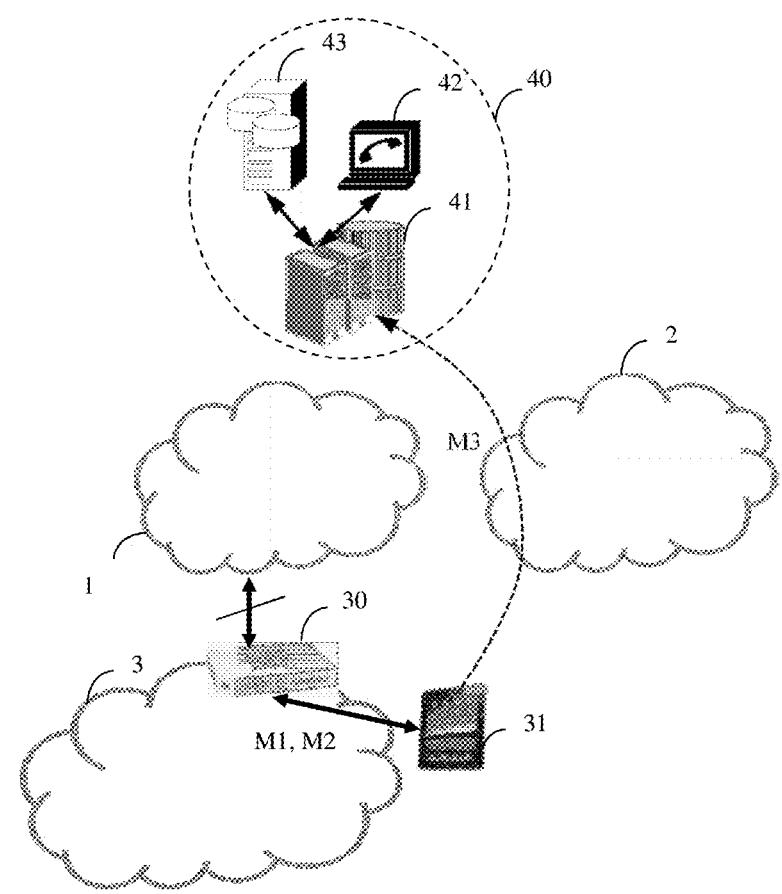
FIGS. 1a and 1b show a system for assisting in remote diagnosis in a communication network according to two embodiments.
Figure 1B:
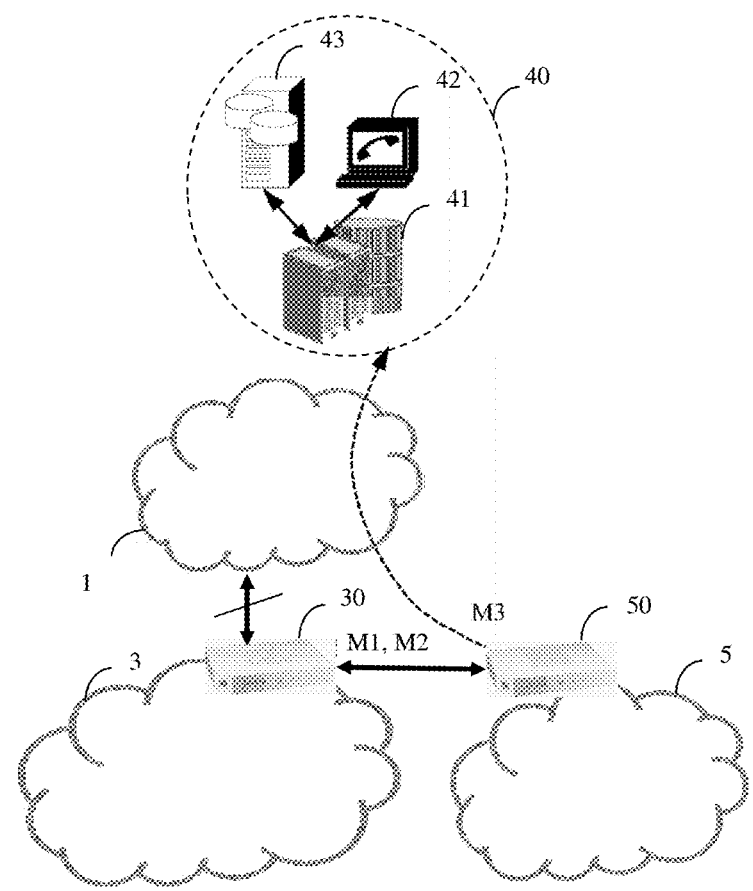

FIGS. 1a and 1b show, in its environment, a private or local area communication network 3 administered remotely by an administrative system 40. The IP ("Internet Protocol") protocol is used by the devices in the private network to communicate among one another and also to communicate with a wide area communication network or WAN ("wide area network"), such as the Internet network.

For the environment shown in FIGS. 1a and 1b, local area communication network 3 is understood to mean a network of LAN ("local access network") type. This network may be particularly a home network or a company network. An access gateway 30 is designed to provide devices of the local area network 3 with access to the wide area communication network (for example the Internet) via an access network 1. By way of example, the access network 1 is an xDSL (for "digital subscriber line", the x indicating that it may be an ADSL, HSDL, VDSL, etc., network) access network. It may also be an FTTH (for "fiber to the home") network. No limitation is placed on the type of the access network 1.

The local area network 3 may be either a wired network of Ethernet type, according to the IEEE 802.3 standard, or a wireless network of Wi-Fi type, according to the IEEE 802.11 standard, or even a power line communication network PLC.

The devices of the local area network 3 may be any devices, for example home devices, having a wired or wireless network connection. By way of example, they may be a computer, a touch-sensitive tablet, a mobile telephone 31, an online radio set, a landline telephone, a back projector, a television, a TV decoder ("set-top box"), a games console, household appliances, etc.

The administrative system 40 groups a plurality of pieces of equipment allowing the operator of the communication network to administrate and monitor devices, particularly devices belonging to local area networks, including the access gateway. The administrative system 40 particularly comprises a piece of administrative equipment 41, also called auto-configuration server ACS, a call center 42 and operational support centers 43 (OSS, for "operational support system") or business-oriented centers (BSS, for "business support system").

In the embodiment described, the administrative equipment 41 communicates with the devices of the local area network 3 for the purpose of administrating them according to the CWMP remote management protocol ("CPE WAN Management Protocol") defined in the technical report TR-069 drafted by the Broadband Forum.

By means of the CWMP protocol, the administrative equipment 41 can particularly:
- obtain and remotely manage a state of the local area network 3, of the devices connected thereto;
- initiate diagnostic tests;
- download software or firmware files and
- manage events.

The remote administration application uses the CWMP protocol and is reliant on protocol layers TCP/IP, SSL/TLS (for "Secure Sockets Layer/Transport Layer Security"), HTTP (for "HyperText Transfer Protocol"), SOAP (for "Simple Object Access Protocol"), RPC (for "Remote Procedure Call").

The technical report TR-069 anticipates a device 30 of the local area network 3 setting up a connection to the administrative equipment 41 under certain conditions and an "Inform RPC" procedure being executed. In the course of this procedure, the device 30-37 of the local area network 3 transmits various administration data concerning it. The administration data received at the time of this "Inform RPC" procedure are stored in a database (not shown in FIGS. 1a and 1b) and then allow the administrative equipment 41 to perform various management tasks for the device. The administration data particularly comprise one or more data for assisting in a diagnosis. As an illustrative example, the datum LastConnectionError allows the cause of the last connection error to be provided in an "Inform RPC" procedure. Still as an illustrative example, the data or objects IPPingDiagnostics, WANDSLDiagnostics or WANATMF5LoopbackDiagnostics allow more detailed diagnosis information to be provided in an "Inform RPC" procedure. These various data are defined more precisely in the report TR-069.

The access gateway 30 is identified to the administrative equipment 41 by means of a unique identifier ID. As an illustrative example, this identifier comprises an organization identifier OUI, for "Organizationally Unique Identifier", encoded over 24 bits. Such an identifier OUI is attributed to a manufacturer or an organization and is used in the family of standards 802 LAN, such as Ethernet, token ring, etc. The unique identifier ID also comprises data such as a product class and a serial number.

FIG. 1a illustrates a first embodiment of the system allowing implementation of the method for assisting in diagnosis. Some of the devices of the local area network 3 are also designed to communicate directly with the Internet wide area communication network via an access network 2, which is separate from the access network 1. Directly is understood to mean that the gateway 30 does not intervene in these interchanges, nor does the access network 1. By way of example, the access network 2 is a third or fourth generation 3GPP mobile network. The mobile terminal 31 thus has a means of direct communication with the Internet communication network. In this first embodiment, the mobile terminal plays a proxy role for a service for assisting in diagnosis.

FIG. 1b illustrates a second embodiment of the system allowing implementation of the technique for assisting in diagnosis. The common portions between FIGS. 1a and 1b are not set out in detail again. A second access gateway 50 allows devices of a second local area network 5 to access the wide area communication network. As represented in FIG. 1b, this access is effected via the access network 1. No limitation is attached to this representation. The access gateway 50 can be connected via another access gateway. The administrative equipment 41 also communicates with the devices of the local area network 5, including the access gateway 50, for the purpose of administrating them according to the remote management protocol CWMP.

Figure 2:
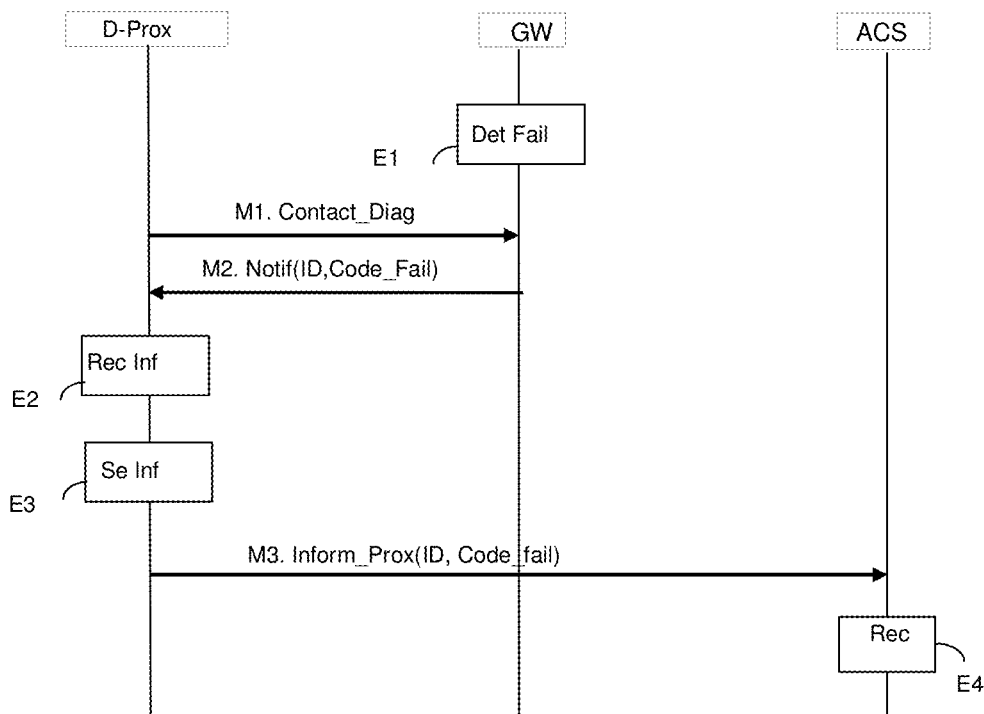
FIG. 2 illustrates steps of a method for assisting in diagnosis according to a particular embodiment.

We will now describe the technique for assisting in diagnosis in a particular embodiment, as implemented by the administrative equipment 41, the access gateway 30 and a device playing a proxy role for the access gateway vis-à-vis the administrative equipment in the environment of FIGS. 1a and 1b, in relation to FIG. 2.

In a first step E1, the access gateway 30 detects that a fault affects the access by the gateway to the wide area communication network via the access network 1. By way of example, this fault corresponds to a loss of synchronization DSL owing to pulse noise on the link for the access network, a DHCP ("Dynamic Host Configuration Protocol") problem, a hardware fault at the interface to the access network 1. No limitation is attached to the type of fault. This fault makes any access to the wide area communication network impossible, and prevents communication of a datum for assisting in diagnosis to the administrative equipment 41.

In a second step E2, the proxy device obtains the unique identifier ID from the access gateway 30 and a datum for assisting in a diagnosis of the fault by means of a radio communication channel. This identifier and the datum for assisting in diagnosis are transmitted in a message M2. The datum for assisting in diagnosis corresponds to a piece of information allowing the administrative equipment 41 to identify the fault. By way of limiting example, a code 1 indicates that the fault affects the access interface, a code 2 that the fault is associated with a malfunction in the OSI layer, etc.

In a third step E3, the proxy device sends to the administrative equipment 41 the identifier and the datum that have been obtained via an access means in working order. This identifier and the datum for assisting in diagnosis are transmitted in a message M3 to the administrative equipment 41.

In a fourth step E4, the administrative equipment 41 receives the message M3 and determines that the message M3 comprises information that the device has sent as proxy. The administrative equipment 41 identifies the gateway in question by virtue of the identifier of the access gateway affected by the fault. The administrative equipment 41 also determines the subject of the fault from the datum/data for assisting in diagnosis. On the basis of the information for configuring the access gateway affected by the fault, the administrative equipment 41 can then trigger actions aiming to restore access for the gateway. The administrative equipment 41 can also determine that a problem is located in the access gateway itself when a plurality of access gateways detect an identical fault, and is able to trigger corrective actions in the access network in order to restore access.

It is emphasized at this juncture that the device playing the proxy role is only used for collecting and transmitting one or more datum/data for assisting in diagnosis. It is not a matter of replacing the access provided by the gateway, which is no longer operational, with that of the device playing the proxy role, in working order. Only the traffic associated with the service for assisting in diagnosis is conveyed by the access by the device. The volume of the data is thus limited in comparison with the volume of all of the traffic generated by the pieces of equipment of the local area network.

In a first embodiment, the mobile terminal 31 plays the proxy role. The method thus uses access by the mobile terminal 31 to a radio communication network for contacting the administrative equipment 41.

In a first variant, the access gateway 30 is equipped with a near field communication module. By way of example, it is an NFC, for "Near Field Communication", module. The mobile terminal 31 is also equipped with such a near field communication module. The access gateway 30 detects that the connection to the wide area communication network is no longer in working order (step E1). A warning light or the screen of the access gateway 30 indicates to the user that a problem has occurred. The user launches on its mobile terminal 31 an application for assisting in diagnosis and contacts (message M1) the access gateway 31 in the near field. The mobile terminal 31 and the access gateway 30 are paired for the application for assisting in diagnosis. This pairing triggers transmission by the access gateway 30, to the onboard application on the mobile terminal 31, using NFC, of its gateway identifier and of one or more datum/data for assisting in diagnosis (step E2). The application for assisting in diagnosis that is executed on the mobile terminal 31 then contacts the administrative equipment 41 by means of an HTTP request, for example, and transmits the identifier and the datum/data to said administrative equipment in a request (step E3).

In a second variant, the identifier and the datum/data for assisting in diagnosis are transmitted by a radio communication channel other than NFC in step E2. This allows, if need be, transmission of a greater volume of data for assisting in diagnosis from the access gateway to the mobile terminal. Once near field contact has been made, the mobile terminal 31 can then be moved away from the access gateway. By way of example, the radio communication channel is of WiFi or Bluetooth type. The identifier and the datum/data for assisting in diagnosis can be transmitted using the UPnP (for "Universal Plug and Play") network protocol.

In a third variant, the mobile terminal 31 implements step E1 of detection of the fault. By way of example, the fault is detected when a failure in an HTTP connection is detected or else using the UPnP IGD (for "Internet Gateway Device") protocol. In a particular embodiment, the UPnP IGD protocol allows the mobile terminal 31 (as a control point) to obtain the last error that has occurred (LastConnectionError) on the access gateway 30 by virtue of the GetStatusInfo action of the WANIPConnection service (when the access gateway 30 is connected to the network 1 by the DHCP protocol) or of the WANPPPConnection service (when the access gateway 30 is connected to the network 1 by the PPP, for "Point-to-Point Protocol", protocol). In another embodiment, the fault can also be detected using the UPnP MD (for "Manageable Device") protocol. The reason is that the UPnP MD protocol allows the mobile terminal 31 (as a control point) to launch diagnoses on the access gateway 30 via the actions Ping, NSLookup, Traceroute, GetBandwidth or SelfTest of the BasicManagement service. Once the fault has been detected, execution of the application for assisting in diagnosis is triggered in order to obtain the identifier and the datum/data for assisting in diagnosis in step E2.

These three variants can also be combined with one another if need be. Other variants are also envisageable, although not described explicitly.

In this first embodiment, the mobile terminal 31 belongs to the local area network 3. Nevertheless, no limitation is attached to this belonging to the local area network 3. It is easily understood that it is also possible for the mobile terminal to be external to this local area network.

This first embodiment is thus reliant on the following elements:
- at the access gateway 30, an application allowing detection of a fault affecting access to the wide area communication network and transmission of the identifier of the access gateway and of one or more diagnosis datum/data;
- at the mobile terminal 31, an application allowing obtainment of the identifier of the gateway and of the datum/data for assisting in diagnosis and transmission of the data obtained to the administrative equipment 31;
- at the administrative equipment 31, an application allowing reception, from the mobile terminal 31, of an identifier of the gateway affected by the fault and of one or more datum/data for assisting in diagnosis and processing of this information as if it had been sent by the access gateway affected by the fault. This application is of Web Service type, for example.

In a second embodiment, another gateway 50 plays the proxy role. The method thus uses access by another access gateway 50 to the same access network or else to another access network in order to contact the administrative equipment 41. It is enough for this access to itself be in working order when that of the access gateway is affected by the fault.

The text below relates to the case in which the two access gateways are equipped with a radio communication module, for example a low consumption radio communication module. By way of example, it is a DECT ULE (for "Digital Enhanced Cordless Telephone-Ultra Low Energy") module. This DECT ULE standard uses the frequency band 1.7 GHz-1.9 GHz. Each access gateway 30, 50 broadcasts a beacon signal. This beacon signal carries information such as the identity of the access gateway and its mode of operation.

The access gateway 30 detects that the connection to the wide area communication network is no longer in working order (step E1).

The access gateway 30 looks for whether it is located in a coverage area of another access gateway 50. This involves scanning all of the radio frequencies allocated to the DECT ULE technology in order to identify whether at least one beacon signal from another access gateway is received. The radio range of the DECT ULE technology is in the order of 600 meters externally and 70 meters internally. It is emphasized at this juncture that this search is not necessarily effected upon detection of a fault affecting access to the wide area communication network. The access gateway 30 can particularly effect this search when it is initialized, and can regularly update a list of access gateways within its range via the DECT ULE standard.

The text below relates to the case in which the access gateway 30 is located in the coverage area of at least one other access gateway. When multiple other access gateways are detected, the access gateway 30 selects another access gateway 50 in order to serve as a relay therefor. This selection may be based on a power level of the beacon signal.

The access gateway 30 then uses the communication channel to transmit its gateway identifier and one or more datum/data for assisting in diagnosis to the other access gateway 50 (step E2).

The other access gateway 50 contacts the administrative equipment 41, for example by means of an HTTP request, and transmits thereto the identifier of the gateway affected by the fault and the datum/data in a notification (step E3) compliant with the CWMP protocol. This notification is adapted to indicating in particular that the access gateway 50 that sends the notification plays a proxy role for the access gateway 30 affected by the fault. This allows more rapid selection of an access gateway in order to play the proxy role and thus reduces the transmission time for the identifier and for the datum for assisting in diagnosis to the administrative equipment.

This cooperation between the access gateways thus allows transmission of the data for assisting in diagnosis to the administrative equipment 41.

In a variant of this second embodiment, an access gateway designed to play the repair proxy role broadcasts in the beacon signal a datum indicating that it provides a proxy service for assisting in repair. Thus, when another access gateway is selected, the access gateway 30 can directly determine whether the other access gateway 50 offers the proxy service for assisting in diagnosis.

The second embodiment and the variant thereof are described using the DECT ULE standard in order to transmit to the proxy gateway the identifier of the access gateway affected by the fault and the datum/data for assisting in diagnosis. It is also possible to use other types of radio communication channels, such as WiFi, for example.

This second embodiment is thus reliant on the following elements:
- at the access gateway 30, an application allowing detection of a fault affecting access to the wide area communication network and transmission of the identifier of the access gateway and of one or more diagnosis datum/data to another access gateway;
- at the other access gateway 50, an application allowing obtainment of the identifier of the gateway affected by the fault and of the datum/data for assisting in diagnosis and transmission of the data obtained to the administrative equipment 31;
- at the administrative equipment 41, a software module designed to receive from an access gateway playing a proxy role an identifier of the gateway affected by the fault and one or more datum/data for assisting in diagnosis and to process this information as if it had been sent directly by the access gateway affected by the fault.

Figure 3:
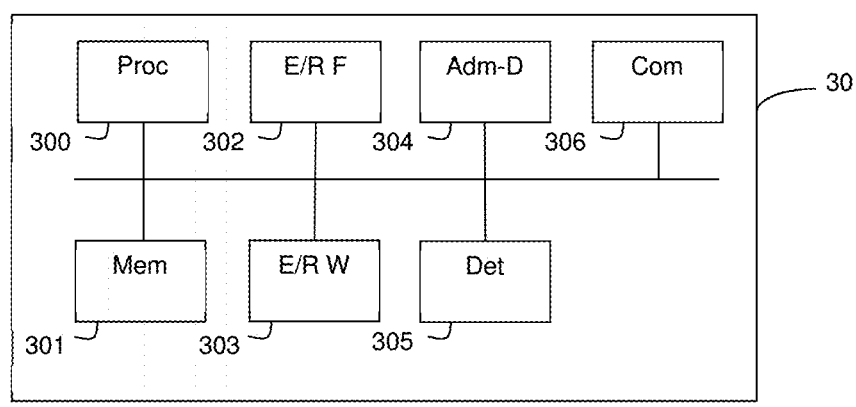
FIG. 3 shows an access gateway according to a particular embodiment.

We will now describe an access gateway 30 for a wide area communication network in a particular embodiment with reference to FIG. 3. Such a gateway is designed to be administrated remotely by a piece of administrative equipment 41 and comprises particularly:
- a memory area 301, designed to store an application that comprises code instructions for implementing the steps of the method for assisting in remote diagnosis, as described in relation to FIG. 2;
- a storage memory, not shown, designed to store data used for implementing the method for assisting in remote diagnosis, as described in relation to FIG. 2;
- a processor 300 for executing code instructions from software modules;
- an interface module 302 for the access network 1, designed to send and receive data;
- a communication module 303, designed to send and receive data by means of a radio communication channel;
- an administrative module 304, designed to send and receive remote administration data from a piece of administrative equipment 41;
- a module 305 for detecting a fault, designed to detect a fault affecting access by the gateway to the wide area communication network via the interface module 302;
- a module 306 for controlling sending, to a device, of an identifier of the access gateway and of a datum for assisting in a diagnosis of the fault by means of a radio communication channel.

It is emphasized at this juncture that the access gateway 30 also comprises other processing modules, which are not shown in FIG. 3, designed to implement the various functions of an access gateway.

The administrative module 304 particularly implements the functions defined in the technical report TR-069.

The interface module 302 is an xDSL module, for example.

In the first embodiment, in its first variant, the module 303 is an NFC module. The identifier of the access gateway and the datum for assisting in diagnosis are sent via the module 303.

In the first embodiment, in its second variant, the access gateway 30 moreover comprises a second radio communication module, not shown in FIG. 3, such as a WiFi or Bluetooth module. This second module can particularly be designed to communicate with pieces of equipment of the local area network 3. The identifier of the access gateway and the datum for assisting in diagnosis are sent via this second module.

In the second embodiment, the module 303 is a DECT ULE, WiFi or DECT, etc., radio module. The identifier of the access gateway and the datum for assisting in diagnosis are sent via the module 303. In one variant, the control module 306 is moreover designed to receive in the beacon signal a datum that is broadcast by another access gateway and indicates that this other access gateway provides a proxy service for assisting in diagnosis.

Figure 4:
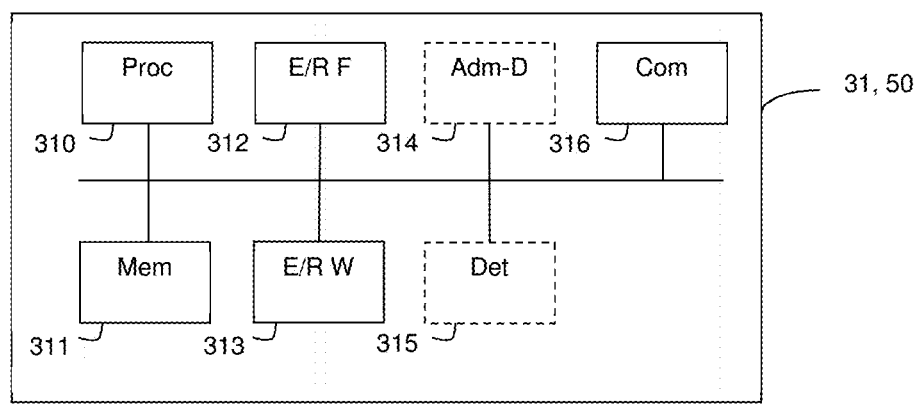
FIG. 4 shows a device playing a proxy role according to a particular embodiment.

We will now describe a device playing a proxy role for a service for assisting in diagnosis in a particular embodiment with reference to FIG. 4. Such a device particularly comprises:
- a memory area 311, designed to store an application that comprises code instructions for implementing the steps of the method for assisting in remote diagnosis, as described in relation to FIG. 2;

a storage memory, not shown, designed to store data used for implementing the method for assisting in remote diagnosis, as described in relation to FIG. 2:

a processor 310 for executing code instructions from software modules;

an interface module 312, designed to send and receive data from a wide area communication network;

a communication module 313, designed to send and receive data by means of a radio communication channel;

a module for assisting in diagnosis 316, designed to obtain from an access gateway affected by a fault a gateway identifier and a datum for assisting in a diagnosis of the fault by means of a radio communication channel and to control sending, to a piece of administrative equipment, of the identifier and of the datum that have been obtained via an access means in working order.

In the first embodiment, the device is a mobile terminal. The interface module 312 is then a module for communication via the mobile access network 2.

In the first variant, the communication module 313 is an NFC module. The identifier of the access gateway and the datum for assisting in diagnosis are received via the module 313.

In the second variant, the device moreover comprises a second radio communication module, not shown in FIG. 4, such as a WiFi or Bluetooth module. The identifier of the access gateway and the datum for assisting in diagnosis are received via this second module.

In the third variant, the device moreover comprises a module for detecting a fault 315, which is designed to detect a fault affecting access by the gateway to the wide area communication network.

In the second embodiment, the device is another access gateway, of similar structure to the access gateway 30 described in relation to FIG. 3. The device then comprises an administrative module 314, which is designed to send and receive remote administration data from a piece of administrative equipment 41. The module 313 is a DECT ULE, WiFi or DECT, etc., radio module. The identifier of the access gateway and the data for assisting in diagnosis are received via the module 313. In one variant, the module for assisting in diagnosis 316 is moreover designed to control the broadcast, in the beacon signal, of a datum indicating that the access gateway provides a proxy service for assisting in diagnosis.

The technique for assisting in diagnosis is implemented by means of software and/or hardware components. With this in mind, the term "module" may, in this document, correspond either to a software component or to a hardware component or to a set of hardware and/or software components, which is capable of implementing a function or a set of functions, according to the description above for the module in question.

A software component corresponds to one or more computer programs, one or more subroutines of a program or, more generally, to any element of a program or of a piece of software. Such a software component is stored in memory and then loaded and executed by a data processor of a physical entity and is capable of accessing the hardware resources of this physical entity (memories, recording media, communication buses, electronic input/output cards, user interfaces, etc.).

In the same way, a hardware component corresponds to any element of a hardware assembly. It may be a programmable or nonprogrammable hardware component, with or without an integrated processor for executing software. By way of example, it is an integrated circuit, a chip card, an electronic card for executing a piece of firmware, etc.

In one particular embodiment, the modules 304, 305, 306 are designed to implement the method for assisting in diagnosis described above. They are preferably software modules comprising software instructions for executing those of the steps of the method for assisting in diagnosis described above that are implemented by an access gateway. The invention therefore also concerns:

a program for an access gateway, comprising program code instructions intended to control the execution of the steps of the method for assisting in diagnosis described above when said program is executed by this access gateway;

a recording medium that is readable by an access gateway and on which the program for a gateway is recorded.

In one particular embodiment, the modules 314, 315, 316 are designed to implement the method for assisting in diagnosis described above. They are preferably software modules comprising software instructions for executing those of the steps of the method for assisting in diagnosis described above that are implemented by a device playing a proxy role for a service for assisting in diagnosis.

The invention therefore also concerns:

a program for a device, comprising program code instructions intended to control the execution of the steps of the method for assisting in diagnosis described above when said program is executed by said device;

a recording medium that is readable by a device on which the program for a device is recorded.

The software modules can be stored in or transmitted by a data medium. This may be a hardware storage medium, for example a CD-ROM, a magnetic floppy disk or hard disk, or else a transmission medium such as an electrical, optical or radio signal, or a telecommunication network.

The invention also concerns a system for assisting in diagnosis, comprising an access gateway 30 and at least one device 31, 50, as described above.

An exemplary embodiment of the invention overcomes inadequacies/disadvantages of the prior art and/or makes improvements thereto.

Although the present disclosure has been described with reference to one or more examples, workers skilled in the art will recognize that changes may be made in form and detail without departing from the scope of the disclosure and/or the appended claims.

The invention claimed is:

1. A method for assisting in remote diagnosis, by a piece of administrative equipment, of an access gateway, said gateway allowing access to a wide area communication network via an access network, said method comprising acts of:

detection of a fault affecting access by the gateway to the wide area communication network via said access network;

obtaining, by a device, an identifier for the access gateway and a datum for assisting in a diagnosis of the fault by using a radio communication channel;

sending, by said device, said identifier and said datum, which have been obtained, via an access means in working order, to the administrative equipment.

2. The method for assisting in remote diagnosis as claimed in claim 1, moreover comprising a pairing of said device with the access gateway in order to obtain said identifier and said datum.

3. The method for assisting in remote diagnosis as claimed in claim 1, moreover comprising a detection of said device by the access gateway.

4. The method for assisting in remote diagnosis as claimed in claim 3, moreover comprising a broadcast, by the device, of a datum indicating that a proxy service for assisting in diagnosis is available.

5. An access gateway designed to allow access to a wide area communication network via an access network, said gateway comprising:
   an administrative module, designed to send and receive remote administration data from a piece of administrative equipment;
   a module designed to detect a fault affecting access by the gateway to the wide area communication network via said access network;
   a module designed to send to a device an identifier for the access gateway and a datum for assisting in a diagnosis of the fault by using a radio communication channel, said identifier and said datum being intended to be sent by said device to said administrative equipment via an access device in working order; and
   a processor, which implements at least one of the modules.

6. A device for assisting in diagnosis of a fault affecting access by an access gateway to a wide area communication network via an access network, said device comprising:
   a module designed to obtain an identifier for the access gateway and a datum for assisting in a diagnosis of the fault by using a radio communication channel and to send to a piece of administrative equipment said identifier and said datum, which have been obtained via an access device in working order, said administrative equipment being provided for remote administration of the access gateway; and
   a processor, which implements the module.

7. A non-transitory computer-readable medium comprising a program stored thereon, comprising program code instructions that configure the access gateway to perform a method of assisting in remote diagnosis of the access gateway by a piece of administrative equipment, when said program is executed by said gateway, said gateway allowing access to a wide area communication network via an access network, said method comprising acts of:
   sending and receiving remote administration data from the piece of administrative equipment;
   detecting a fault affecting access by the gateway to the wide area communication network via said access network;
   sending to a device an identifier for the access gateway and a datum for assisting in the diagnosis of the fault by using a radio communication channel, said identifier and said datum being intended to be sent by said device to said administrative equipment via an access means in working order.

8. A non-transitory computer-readable medium comprising a program stored thereon, comprising program code instructions that configure a device to perform a method assisting in diagnosis of a fault affecting access by an access gateway to a wide area communication network via an access network, when said program is executed by said device, wherein the method comprises:
   obtaining an identifier for the access gateway and a datum for assisting in a the diagnosis of the fault by using a radio communication channel; and
   sending to a piece of administrative equipment said identifier and said datum, which have been obtained via an access means in working order, said administrative equipment being provided for remote administration of the access gateway.

* * * * *